May 1, 1962    C. S. ROBINSON ETAL    3,032,374
RETRACTABLE SEAT BELT
Filed Nov. 10, 1958
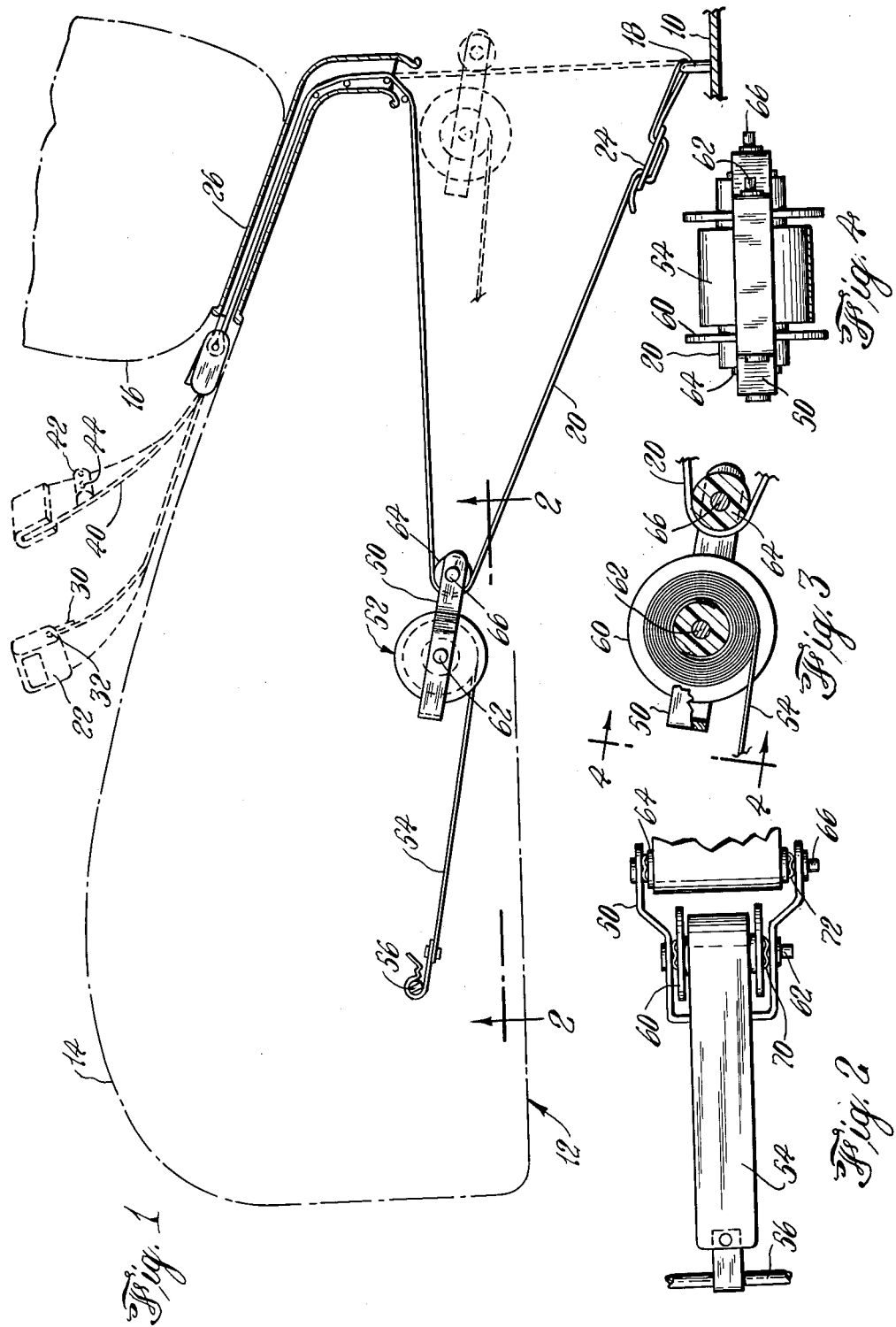

United States Patent Office 3,032,374
Patented May 1, 1962

3,032,374
RETRACTABLE SEAT BELT
Cecil S. Robinson, Englewood, and Warren A. Reider, Park Ridge, N.J., assignors to Robinson Technical Products, Inc., a corporation of New York
Filed Nov. 10, 1958, Ser. No. 773,045
4 Claims. (Cl. 297—388)

The present invention relates to seat belts or safety belts, such as those used in airplanes, automotive vehicles and the like. More particularly, the present invention relates to a retractable seat belt of the general type disclosed in Patent 2,488,858 granted November 22, 1949 to Franz.

In the Franz patent, the two halves of the safety belt are arranged to be wound upon spring actuated reels which serve to retract both halves of the safety belt when not in use by the passenger. The buckles or other fastening devices customarily provided are left projecting in a convenient position when the halves of the belt are retracted. Thus, a passenger desiring to use the belt may grasp the buckles and pull the full length of the safety belt halves from the reels and fasten the opposite ends across his body in the usual manner.

The present invention achieves the same general results as said Franz patent, but does so in a simpler manner and with structural features which are readily adaptable to use in various sorts of vehicles. The present invention, although not restricted to such use, is particularly well adapted for use in passenger automobiles which ordinarily do not have individual or "bucket" seats. The traditional construction of automobile seats calls for the seating of at least two persons side-by-side on a wide seat cushion which is usually separate from the back. For the maximum protection of the passengers the belt halves should extend rearwardly through the intersection between the seat and back. The safety belts of the present invention are arranged for retraction through such intersection and present particular advantage when used in automotive vehicles since the non-retractable belts now customarily supplied present considerable inconvenience to the passengers. When such conventional belts are unfastened they constitute an obstruction on the top of the seat, and when the passenger leaves the vehicle through the door at least one half of the belt is likely to be dragged off the seat to dangle through the door opening where it may be caught in the door or at least must be picked up and replaced before closing the door. All of such inconveniences are eliminated by the use of the present invention, wherein the belt is gently retracted through a passageway afforded between the seat and the back into a position wherein only the buckles or fastening parts protrude into an accessible position. When thus retracted, the buckles will be so located as to be unlikely to come into contact with the person in the event the belts are not to be used and yet are readily accessible for use when desired.

It is a particular feature of the present invention that the retracting mechanism need not be constructed to withstand shock loads to which the belt may be subjected in a collision, for example. The belt may be anchored to any structural portion of the vehicle in a conventional manner best calculated for strength and protection and the retracting mechanism operates only to pull a loop of the belt under the seat when the belt is not in use.

FIG. 1 is an end elevational view of a retractable seat belt made in accordance with the present invention and showing the same installed in a seat of the type generally used in automotive and similar passenger vehicles;

FIG. 2 is a fragmentary sectional view along the line 2—2 in FIG. 1;

FIG. 3 is a fragmentary side elevational view of the retracting mechanism of the present invention; and FIG. 4 is an end elevational view of the retracting mechanism along the line 4—4 in FIG. 3.

It is an object of the presenting invention to provide simple, effective and inexpensive means for retracting safety belts in airplanes, automobiles, trucks and the like.

It is a further object of the present invention to provide a safety belt having retracting means which, in and of itself, constitutes a unit which can be readily installed in both such vehicles in use and in such vehicles at the time of manufacture or assembly without extensive alteration or modification of the vehicle.

Other and further objects will become apparent to those skilled in the art upon a consideration of the following detailed description of a preferred, but not necessarily the only form of the present invention, taken in connection with the drawings and accompanying and forming a part of this specification.

Referring now to the drawings, in FIG. 1, the reference numeral 10 indicates the frame or floor or other rigid part of the body of a vehicle such as a passenger automobile. A seat, generally indicated as 12, is shown in broken lines, as are the cushion 14 and a portion of the back 16. It will be understood that the seat 12 may be of any conventional construction and may be supported in any suitable fashion customary in the construction of automotive vehicles. For example, it is quite customary in connection with the front seats of such vehicles to mount the same in tray-like structures which are movable verically and horizontally by hand or by power mechanism for adjustment of the forward and rearward position and the height of the seat to suit the comfort of the occupant. No such mechanism is shown herein, it being understood that the present invention may be adapted to any such structure or arrangement.

As is usual in safety-belt installations, an anchoring device 18 is secured rigidly to the floor or frame 10 of the vehicle for attachment of one end of each half of the safetly belts. While the anchoring device 18 is shown as being attached to the floor or frame, this has been done only for purposes of illustration, it being understood that the anchor may be attached to any portion of or attachment to the vehicle, including the seat itself, so long as the portion to which the anchor is attached is of sufficient strength and stability to withstand the force which would be applied thereto by the safety belt in the event of an accident. Preferably the anchoring device 18 is located beneath and in substantial vertical alignment with the rear edge of the cushion 14 and back 16. It is of no consequence to the present invention whether the anchoring device 18 constitutes a single crossbar extending for a substantial width of the vehicle and to which all of the fixed ends of the belt halves may be attached or whether individual anchoring devices 18 for each such belt be supplied. It will be understood that, for maximum protection of the user of the belt, the ends of the same should be firmly anchored to a structural portion of the vehicle and that, when the belt is buckled around the user's body, it should extend, without substantial slack and in as direct a line as possible from the anchorage, around the user's body and to the anchor at the opposite end.

In FIG. 1, a belt half 20 is shown in full lines in a retracted position in which a buckle portion 22, at the free end of the belt, lies on the upper surface of the cushion 14 in a position adjacent to the intersection between such upper surface and the forward surface of the back 16. The opposite end of the belt half 20 is looped around the anchoring device 18 and is held in adjusted position by a conventional adjustable fastener 24. In FIG. 1, the belt half 20 is extended through a guide 26 disposed between the cushion 14 and back 16. The guide 26 may be a separate unit inserted between cushion and back, may be built into the cushion or back at the time of manufacture or may be omitted where sufficient space is provided between the cushion 14 and back 16 to allow the belt half 20 to slide freely without binding.

It will be appreciated that the buckle portion 22 on the belt half 20 may be of any suitable or conventional construction. It is only essential that the buckle portion be of such size or otherwise so arranged as not to be capable of entering the passageway between the cushion 14 and back 16, whether such passageway is afforded by a guide such as 26 or by a space between the cushion and back. In some instances the buckle portion 22 may be secured in a loop of the belt half 20 formed by turning the end 30 around a pin 32 in the buckle 22. The double thickness of belt thus formed may be too thick to enter the passageway between the cushion 14 and back 16 while in some instances, as shown in the drawings, the buckle itself will be too large to enter the passageway.

In some forms of buckle devices for safety belts, the opposite belt half 40 intended for interlocking with the buckle 22, when the two belt halves are joined in use around the occupant of the vehicle, may be provided with a tongue. In the event such tongue does not itself provide sufficient thickness to prevent entry thereof into the passageway between the cushion and back, such end of the belt may be provided with a rubber or plastic stop 42 secured by rivets or similar devices 44 in a position adjacent to the free end of the belt half 40, all as shown in dotted lines in FIG. 1. It will be understood that other forms of buckle or fastening devices may be used and that, for the purposes of the present invention, the individual components thereof will either be of such size as not to be capable of entering the passageway between the cushion and back or may be provided with supplemental stops such as that shown at 42 in the present disclosure.

As shown in dotted line in FIG. 1, when the individual belt halves 20 and 40 are extended into position for use, lengths thereof will extend substantially vertically and free of slack from anchoring device 18 to the passageway between the cushion and back through which such belt halves extend.

Under the present invention, when not in use, the belt halves are individually retracted by a yielding pull exerted upon the lengths of the belt halves between the anchoring device 18 and the passageway between the custom 14 and back 16.

Referring now to FIGS. 2, 3 and 4, a yoke 50, carrying a spring-retracting unit 52, is provided to engage each half at a point between the anchoring device 18 and the passageway between the cushion and back. While each such unit 52 may be a tape or strip arranged to be wound upon a spring-driven reel, such as shown in the afore-mentioned Franz patent, it is preferred that the unit 52 constitute a self-coiling spring 54, the free end of which may be secured to the seat 12, or any stationary part of the vehicle suitably spaced from the back of the seat. For example, the free end of the springs 54 may be provided with a hook which may be readily attached to a wire or rod 56 forming a part of the seat cushion 14. Each spring 54 is preferably pre-stressed in such manner as to tend constantly to coil upon itself. Such pre-stressing is familiar in the art and is accomplished in some instances by "cross-curving," in which event the spring exhibits a tendency to recoil with a substantially constant force. In other instances, the constant recoiling effect can be achieved by reversely winding, or by transverse stressing of the spring, all as well known in the art.

Each spring 54 is mounted upon the hub of spool 60, the spool 60 being rotatably supported on the yoke 50 by a shaft 62. It is not essential that the inner end of the spring 54 be attached to the spool inasmuch as it is self-coiling and will grip the hub. While any type of free sliding connection between the yoke 50 and belt half will be satisfactory, it is preferred to minimize friction and drag, to employ a roller 64 rotatably supported on the yoke 50 by a shaft 66. Obviously, many types of materials may be used for the spool 60 and roller 64. It is preferred, to reduce friction and weight to a minimum and thus make it possible to use springs 54 of relatively light force, to provide the yokes 50 with spools and rollers made of nylon or other plastic material having excellent bearing characteristics so that there is little friction and weight and no need for lubrication upon the shafts 62, 66. To further minimize friction, wavy washers, as shown at 70 and 72 respectively, may be provided at the opposite ends of the shafts 62, 66.

When not in use, the belt halves are retracted through the passageway between the cushion 14 and back 16, as shown in solid lines in FIG. 1. For use, the user occupying the seat between the belt halves, grasps the ends of the two belt halves projecting through the passageways, withdraws the belt halves through the passageways, extending the belt halves to the extended position, as shown in dotted lines in FIG. 1, and buckles or joins the free ends of the halves. The springs 54 obviously are of such length as to permit extension thereof into the dotted line position shown in FIG. 1 while still leaving sufficient coils upon the spools 60 to insure retraction. This is the slack-free position assumed when the safety belt has been extended and fastened in position around the body of the user. While the belt halves are in this position the springs 54 will exert a constant pull upon the belt halves to which they are connected. Experience has revealed that the relatively gentle pull thus exerted is not objectionable, particularly when the springs 54 have been carefully chosen to exert just enough pull to retract the belts when they are released without exerting any excessive force. A particular advantage in the present invention lies in the fact that springs 54 of the so-called "constant force" type, which are preferred, do not exert substantially greater force when fully extended than they do when fully retracted.

From the above detailed description of preferred constructions, it will be apparent that there are disclosed structural embodiments which accomplish the objects of this invention. It is a primary feature of advantage that the safety belt halves, when in use, extend directly from secure anchoring means and around the body of the user whereby the user is held firmly in the seat and shock loads may be transmitted directly to the anchoring means. The retracting means of the present invention does not affect the safety or security of the belt installation and accordingly need not be made to withstand shock loads. Modifications and variations in detail will occur to those skilled in the art and it is the intention that the detailed disclosure herein shall be taken as descriptive and illustrative, rather than in a limiting sense.

What is claimed is:

1. In a safety belt retracting mechanism for use in vehicles and the like having a safety belt element with one end free and the other end anchored to said vehicle, the improvement which comprises: a retractor assembly including a frame, a roller rotatably mounted on said frame to rollably engage a safety belt element intermediate the free end and the fixed end thereof, a self-coiling spiral spring having the inner end thereof mounted on said frame to coil thereon, and means for securing the outer end of said spring to a relatively stationary part of the vehicle.

2. A safety belt retracting mechanism in accordance with claim 1 wherein said self-coiling spring is so constructed and arranged as to exert substantially a constant recoiling force in any position assumed by said retractor assembly as a result of extending or retracting said belt.

3. In a safety belt retracting mechanism for use in vehicles and the like having a seat cushion and a seat back, and provided with a safety belt element having one end anchored to said vehicle at a point adjacent the rear of said seat cushion and extending upwardly to the level of the top of said seat cushion and forwardly between said seat back and the top of said seat cushion to terminate in a free end accessible from the top of said seat cushion, the improvement which comprises the combination of: a retractor assembly including a frame having spaced members for receiving a safety belt therebetween, a roller rotatably mounted on said frame adapted to engage and roll lengthwise of a safety belt element received between said spaced members, a self-coiling spiral spring having the inner end thereof mounted on said frame to coil thereon, and means for securing the outer end of said spring to a relatively stationary part of a vehicle below the level of the top of a seat cushion; and a low friction guide member for said belt element including a portion extending upwardly from the level of the bottom of said seat cushion, and a hollow portion extending forwardly between the top of said seat cushion and the seat back associated with said seat cushion.

4. A safety belt retracting mechanism in accordance with claim 3 wherein said self-coiling spring is so constructed and arranged as to exert substantially a constant recoiling force in any position assumed by said retractor assembly as a result of extending or retracting said belt.

References Cited in the file of this patent
UNITED STATES PATENTS

| | | |
|---|---|---|
| 801,367 | Davidson | Oct. 10, 1905 |
| 1,032,593 | Fairbanks | July 16, 1912 |
| 1,977,546 | Fornelius | Oct. 16, 1934 |
| 2,217,323 | Sackett | Oct. 8, 1940 |
| 2,798,539 | Johnson | July 9, 1957 |
| 2,830,655 | Lalande | Apr. 15, 1958 |